(12) United States Patent
Chen

(10) Patent No.: US 7,646,317 B2
(45) Date of Patent: Jan. 12, 2010

(54) DECODING METHOD UTILIZING TEMPORALLY AMBIGUOUS CODE AND APPARATUS USING THE SAME

(76) Inventor: Jen-Te Chen, 2F-2, No. 471, Dajhou Rd., Shengang Township, Taichung County 429 (TW)

( * ) Notice: Subject to any disclaimer, the term of this patent is extended or adjusted under 35 U.S.C. 154(b) by 0 days.

(21) Appl. No.: 12/110,425

(22) Filed: Apr. 28, 2008

(65) Prior Publication Data

US 2008/0266148 A1 Oct. 30, 2008

Related U.S. Application Data

(60) Provisional application No. 60/914,760, filed on Apr. 30, 2007.

(51) Int. Cl.
*H03M 7/00* (2006.01)
*H03M 11/00* (2006.01)

(52) U.S. Cl. .......................................... 341/50; 341/22

(58) Field of Classification Search .................. 341/50, 341/22, 20, 63, 67, 106; 704/4, 10; 400/472, 400/486

See application file for complete search history.

(56) References Cited

U.S. PATENT DOCUMENTS

| | | | |
|---|---|---|---|
| 4,008,793 A | 2/1977 | Terracina | |
| 4,173,753 A | 11/1979 | Chou | |
| 4,877,405 A | 10/1989 | Stewart | |
| 5,305,207 A | 4/1994 | Chiu | |
| 5,307,267 A | 4/1994 | Yang | |
| 5,790,055 A | 8/1998 | Yu | |
| 5,982,303 A | 11/1999 | Smith | |
| 6,362,752 B1 | 3/2002 | Guo et al. | |
| 6,686,907 B2 | 2/2004 | Su et al. | |
| 6,753,794 B1 | 6/2004 | Adams | |
| 6,766,179 B1 | 7/2004 | Shiau et al. | |
| 6,837,633 B2 | 1/2005 | Lorenzo | |
| 6,874,960 B2 | 4/2005 | Daoud | |
| 6,885,317 B1* | 4/2005 | Gutowitz | 341/22 |
| 7,098,919 B2 | 8/2006 | Kim | |

* cited by examiner

*Primary Examiner*—Peguy JeanPierre

(57) ABSTRACT

In a decoding method and apparatus, the decoding method is used for mapping a plurality of encoding sequences to a plurality of decoding sequences, which is used by non-logographic languages. The decoding method receives an entered encoding symbol and combines the entered encoding symbol to the end of an input sequence, wherein the input sequence is temporally ambiguous such that the input sequence has possibility to be interpreted as at least two different encoding sequence combinations, each of which includes at least one of the encoding sequences.

28 Claims, 10 Drawing Sheets

DECODING METHOD UTILIZING TEMPORALLY AMBIGUOUS CODE AND APPARATUS USING THE SAME

CROSS-REFERENCE

This application claims priority from U.S. Provisional Patent Application No. 60/914,760, filed on Apr. 30, 2007.

BACKGROUND OF THE INVENTION

1. Field of Invention

The present invention relates to a decoding method and apparatus. More particularly, the present invention relates to a decoding method which utilizes temporally ambiguous code and apparatus using the same.

2. Description of Related Art

Today, computer is powerful and small enough to be carried around, in the form of many tiny devices (cellphone, MP3 Player, etc.). The Man Machine Interface (MMI) becomes a challenge due to the limited size of a device. For text input, current solutions include traditional multitap, predictive text input, and small QWERTY keyboards.

The traditional multitap, known as ABC input method, is simple but inefficient and hardly to be mastered. Small QWERTY keyboard assumes that users are familiar with the traditional QWERTY keyboard and this familiarity can be well transferred to the tiny QWERTY keyboard. The first assumption is limited to the PC users but many teenagers may master text input on cellphone before they master the QWERTY keyboard. Although this arrangement may help computer users to find characters more easily than scattered or alphabetic order, the even much smaller key size reduces the usability considerably.

On the other hand, predictive text input greatly reduces the keys required per character over multitap by introducing new problems: (a) predicted text is randomly changed while user input; (b) users can hardly check their typing correctness during input and typo recovery is irritating; (c) upon missed word in its dictionary, users are required to use another input method (typically multitap) and restart again; and (d) the behavior in summary is non-predictable and unreliable in the sense of perception as well as performance.

Furthermore, given a mapping which maps encoding sequences to decoding sequences wherein each encoding sequence is a token, it is so called "spatially ambiguous" if there are multiple mappings for a token. An example of spatially ambiguous is shown in FIGS. 1A and 1B. Refer to FIGS. 1A and 1B, wherein FIG. 1A is a keyboard of a common prior art and FIG. 1B is the spatially ambiguous mapping accordingly. The keypad 100 contains a plurality of keys 101 with a numeral, and special function keys 104 and 105. The traditional spatial ambiguity groups some symbols 103 in a decoding symbol set together and then assigns the said group to a symbol 102 of an encoding symbol set.

After mapping to the domain of encoding symbol set, it is impossible to distinguish the grouped symbols purely base on knowledge of this domain. This process can be viewed as a lousy encoding. To recover the lost information, all possible combinations may be generated and let user choose the correct one.

Multitap resolves spatial ambiguity at character level and lets users roll and choose the intended symbol in the group for each input.

Furthermore, traditional predictive text inputs resolve spatial ambiguity at word level. Take an input of "HOME" for example and illustrated in FIG. 1B. An encoding symbol 110 of the input sequence "4663" represents one decoding symbol 112 of a group 103. A linked network 111 shows all combinations of adjacent encoding symbols. Due to the combinations of an input sequence is $M^L$, where M is the size of a symbol group and L is the input length, it is infeasible to enumerate all combinations (for this case, the combinations are $3^4=81$, but once L=10, it will be $3^{10}=59049$).

Typically, linguistic knowledge can be used to greatly reduce the possible outcomes. A common practice is providing a word dictionary to match up and output those words for user to choose. However, even the linguistic knowledge is introduced, the input sequence "4663" can still be interpreted in many ways such as "HOME", "GOOD", "GONE", "HOOD", "HOOF", "HONE", "GOOF", "IMME", "INNE", "HOND", "INOF" and "GOOE". In other words, there are too many possible resultants to make users to effectively input words by traditional input methods and apparatus.

Therefore, what is needed is to provide a better encoding scheme and corresponding decoding method that can be easily realized by and accommodated to the users.

SUMMARY OF THE INVENTION

One of the objects of the invention is to provide a decoding method which utilizes temporally ambiguous code and apparatus using the same such that number of candidates to be selected can be effectively reduced.

To at least achieve the above and other objects, the invention provides a decoding method for mapping a plurality of encoding sequences, each of which includes at least one encoding symbol chosen from an encoding symbol set, to a plurality of decoding sequences, each of which includes at least one decoding symbol chosen from a decoding symbol set which is used by non-logographic languages. The decoding method receives an entered encoding symbol and combines the entered encoding symbol to the end of an input sequence, wherein the input sequence is temporally ambiguous such that the input sequence has possibility to be interpreted as at least two different encoding sequence combinations, each of which includes at least one of the encoding sequences.

The present invention further provides an apparatus comprising a keyboard, an output device and a decoding device. The keyboard is used for inputting an input sequence including at least one encoding symbol chosen from an encoding symbol set. The output device selectively outputs an output sequence including at least one decoding symbol chosen from a decoding symbol set, wherein the output sequence is generated in accordance with the input sequence. The decoding device includes a mapping which maps a plurality of encoding sequences, each of which includes at least one encoding symbol chosen from the encoding symbol set, to a plurality of decoding sequence, each of which includes at least one decoding symbol, the mapping is used to map the input sequence to the output sequence in according to at least a part of the encoding sequences. Furthermore, when one encoding symbol is entered by the keyboard, the decoding device combines the entered encoding symbol to end of an input sequence and the input sequence is temporally ambiguous such that the input sequence has possibility to be interpreted as at least two different encoding sequence combinations.

The present invention further provides a decoding method comprising the steps of maintaining a mapping that maps a plurality of encoding sequences, each of which includes at least one encoding symbol chosen from an encoding symbol set, to a plurality of decoding sequences, each of which includes at least one decoding symbol chosen from a decoding symbol set which is used by non-logographic languages; receiving encoding symbol or symbols into an input sequence; generating a plurality of encoding sequence combinations if the length of the input sequence is greater than one; selecting one of the encoding sequence combinations; mapping the selected encoding sequence combination into an output sequence according to the mapping; and outputting the output sequence.

The decoding method and apparatus provided in the present invention utilizes temporally ambiguity code such that the candidate to be selected for outputting can be effectively reduced because of the reason which will be discussed in more detail in the description of the preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a shape-based mapping with intermediate translation in according to one embodiment of the present invention.

DESCRIPTION OF THE PREFERRED EMBODIMENTS

Figure 1A:
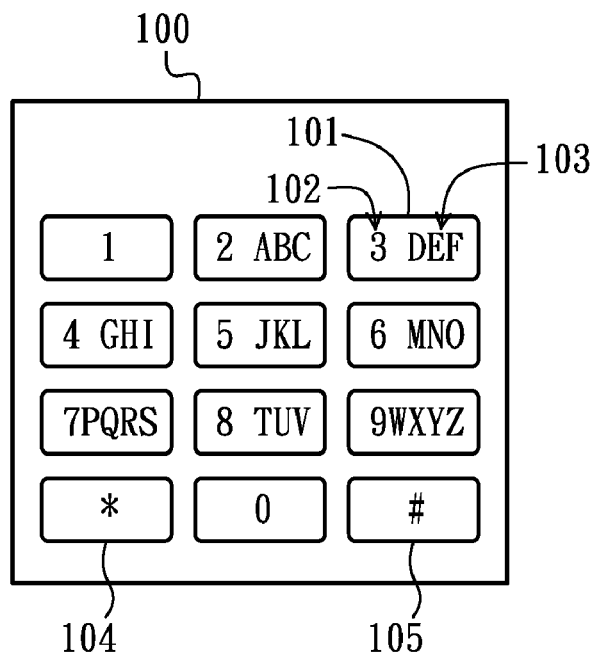
FIG. 1A is a keyboard of a common prior art.
Figure 1B:
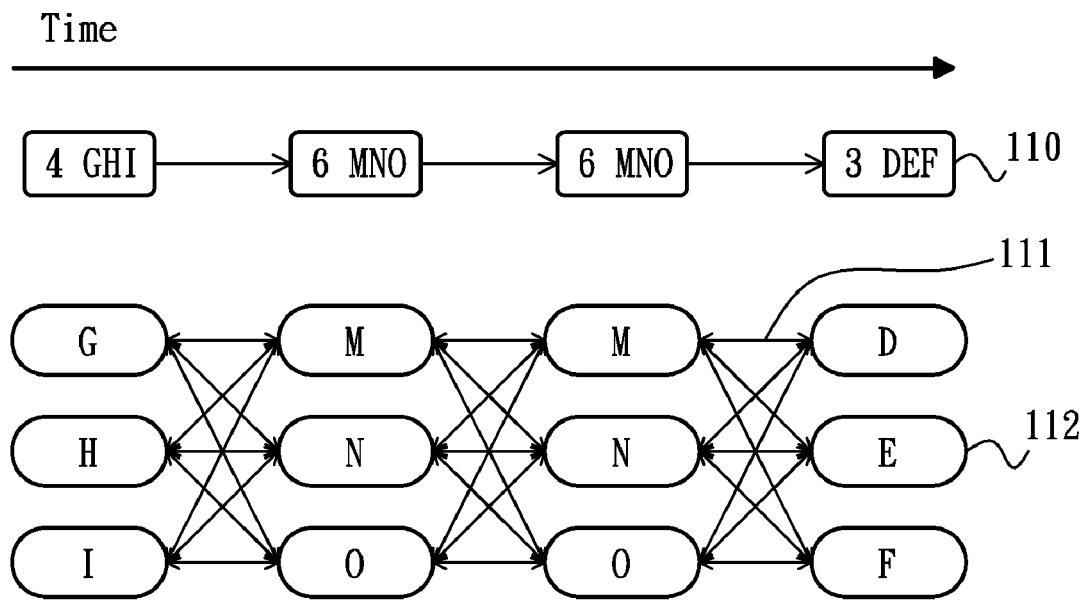
FIG. 1B is a schematic diagram shown spatially ambiguous mapping.

Reference will now be made in detail to the present preferred embodiments of the invention, examples of which are illustrated in the accompanying drawings. Wherever possible, the same reference numbers are used in the drawings and the description to refer to the same or like parts.

Figure 2:
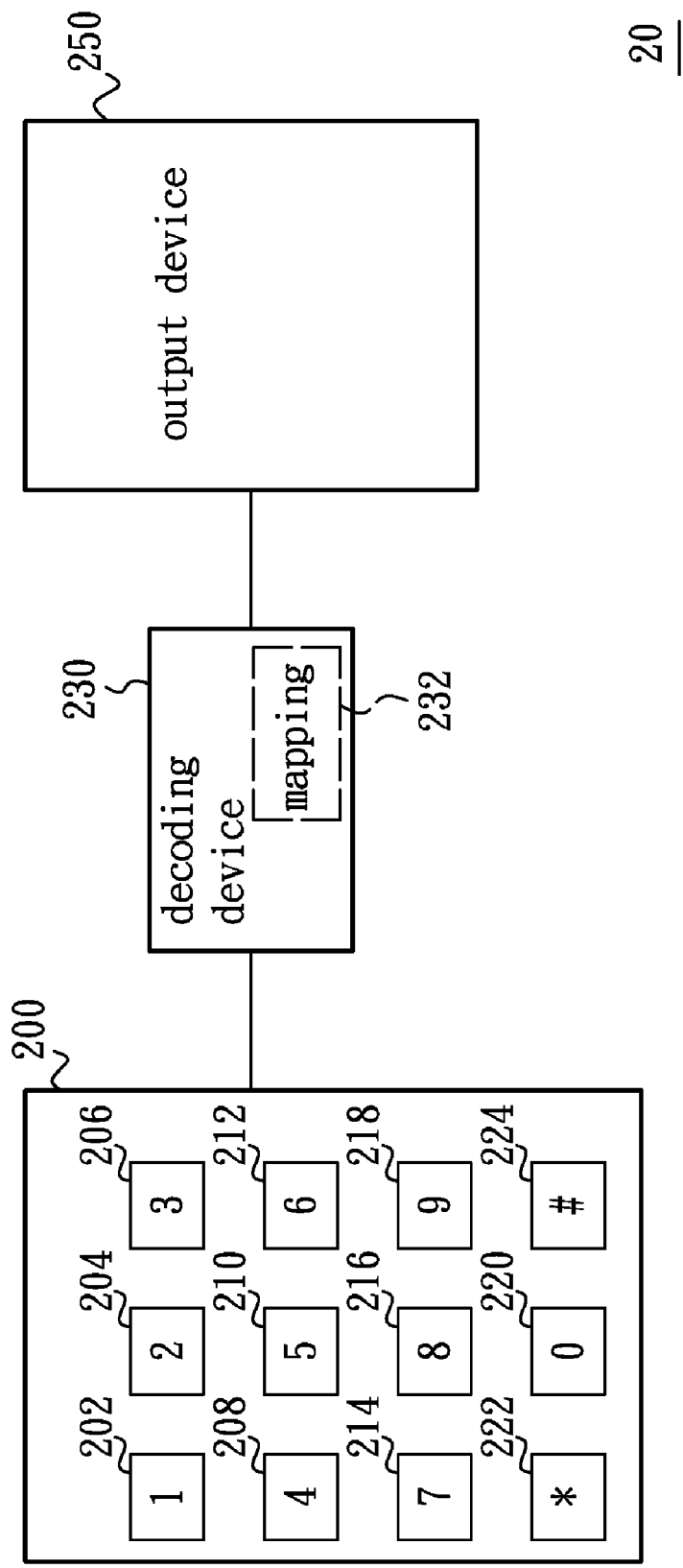
FIG. 2 is a circuitry block diagram of an apparatus according to one embodiment of the present invention.

Refer to FIG. 2, which is a circuitry block diagram of an apparatus according to one embodiment of the present invention. In the embodiment, the apparatus 20 includes a keyboard 200, a decoding device 230 and an output device 250. The keyboard 200 is used for inputting an input sequence including at least one encoding symbol chosen from the encoding symbol set. The encoding device 230 couples to the keyboard 200 via a first communication channel such that the input sequence input by using the keyboard 200 can be received by the decoding device 230 via the first communication channel. Furthermore, the decoding device 230 includes a mapping 232 such that the received input sequence is mapped to an output sequence by using the mapping 232. The output device 250 couples to the decoding device 230 via a second communication channel such that the output sequence generated by the mapping 232 can be shown on it.

The keyboard 200 may be an input device with a plurality of keys, each of which denotes an encoding symbol chosen from an encoding symbol set. For the reduced keyboard problem, we need to map a keyboard alphabet of size K (i.e. encoding symbol set) to a letter alphabet of size N (i.e. decoding symbol set) wherein K<N. For clarity of discussion, and without limiting the scope of this invention, the keyboard 200 in FIG. 2 shows an ordinary keyboard set on a mobile phone. The keyboard 200 includes keys 202~220 for denoting numeric symbols "1", "2", ..., "9" and "0", and keys 222 and 224 for denoting special symbols "*" and "#". The encoding symbol set in the embodiment therefore includes ten numeric symbols and two special symbols mentioned above, and the decoding symbol set in the embodiment includes 26 English alphabet symbols.

Given the mapping 232 that maps each of a plurality of encoding sequences composed by the encoding symbols chosen from the encoding symbol set to a corresponding decoding sequence composed by at least one decoding symbol chosen from the decoding symbol set wherein each encoding sequence is a token, it is so called "spatially ambiguous" if there are multiple mappings for a token, and it is so called "temporally ambiguous" if there are multiple temporal interpretations of an input sequence to generate tokens. The spatial ambiguity is discussed in the prior arts and the temporal ambiguity will be discussed in more detail below.

For fixed-length coding, every fixed-length M encoding symbols in an encoding sequence represent a token and maps to a decoding sequence of decoding symbol. For variable-length coding, a prefix-free code is usually used so that decoder can unambiguously identify each token. If a non-prefix-free code is used, a pre-determined timeout or a timeout kill signal (delimiting key) is needed to clearly identify each intended token. The timeout kill method introduces additional key presses, which is an overhead. Although the timeout method omits additional key presses, it requires user to wait and is less efficient.

Figure 3A:
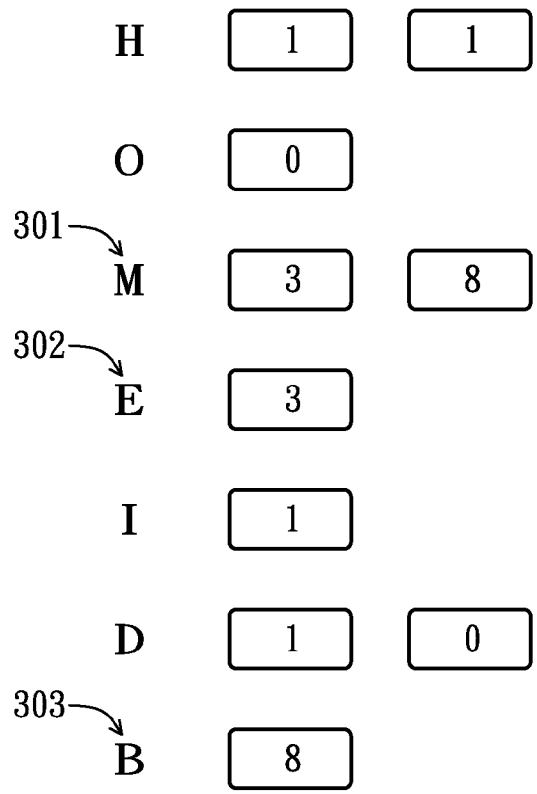
FIG. 3A is a partial coding scheme according to one embodiment of the present invention.
Figure 3B:
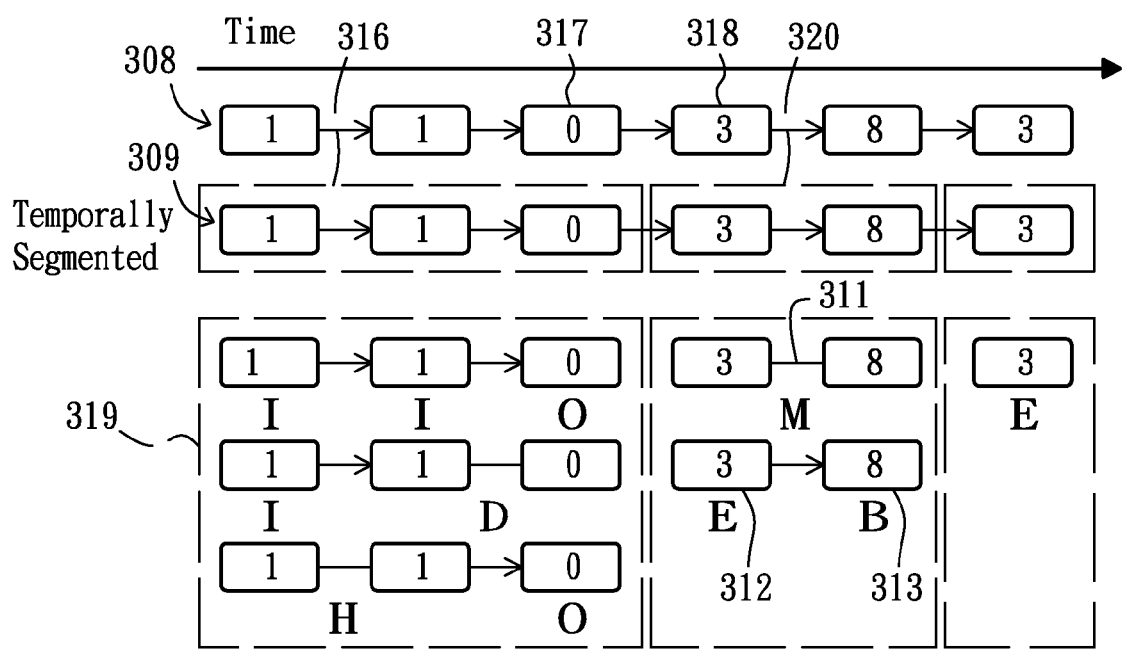
FIG. 3B is a demonstration of input "HOME" in temporal ambiguity according to one embodiment of the present invention.

The temporal ambiguity exists when there are multiple temporal interpretations of an input sequence. To introduce temporal ambiguity into a traditional variable-length coding scheme, we omit the requirement of both timeout and timeout kill signal. This can be demonstrated in FIG. 3A~3B, wherein FIG. 3A is a partial coding scheme according to one embodiment of the present invention and FIG. 3B is a demonstration of input "HOME" in temporal ambiguity according to one embodiment of the present invention. For example, a sequence "38" 320 can be interpreted as a linked token "3-8" 311 which represents 'M' 301 or as two separated tokens "3" 312 and "8" 313 which represent 'E' 302 and 'B' 303, respectively.

For an input sequence, we can segment it according to temporal ambiguity such that the adjacent symbols of two segments together forming a token (also known as encoding sequence) that has no mapping in the coding scheme. And each segment has multiple temporal interpretations if its length is greater than one. Take FIG. 3B as an example, the input sequence 308 is segmented to the temporally segmented sequence 309 with multiple segments in dash line. There is no mapping of token "03" in the coding scheme of FIG. 3A for the adjacent symbols 317 and 318. Hence the two segments 316 and 310 can be temporally segmented.

The procedure of temporal segmentation can be done by successively examining each symbol of the input sequence and combined with next symbol to check whether it is a mapped token. If it is, current symbol is accumulated. Else current symbol with previously accumulated symbols formed a temporally ambiguous segment. We define ambiguity length as the length of a temporally ambiguous segment. There is no temporal ambiguity in a segment if its ambiguity length equals one. Furthermore, there are some input sequences can be disambiguated purely by the knowledge of a coding scheme. Take the coding scheme of an embodiment shown in FIG. 4 for example, an input sequence "09" can be identified as "0:9" because there is no mapping for token "09". Hence "09" is mapped to "OR" purely by the knowledge of coding scheme without linguistic temporal ambiguity resolution which will be described in detail later.

For the preferred embodiment, the coding scheme is variable-length such that a decoding symbol is encoded by either one-numeral or two-numeral. In most case, two-numeral with combination 10×10 is sufficient to encode all the decoding symbols. So if a three-numeral is really used, it can be kept in few and specifically handled.

A legal combination of a temporally ambiguous segment is a disambiguated input sequence that can be unambiguously decoded. To enumerate all legal combinations of a temporally ambiguous segment in such coding scheme, it is equivalent to enumerate all combinations such that its ambiguity length is N, each symbol may be connected to previous one or next one but not both. Two connected symbols forms a two-numeral encoding while a symbol without any connection forms a one-numeral encoding. If a symbol is connected in both directions, it is a three-numeral encoding which is illegal in our enumeration and should be specifically handled.

For example, let "1" denotes symbols, "−" denotes bar without connection and "+" denotes bar connected. A sequence of "1111" can be enumerated in 5 combinations: "1−1−1−1", "1−1−1+1", "1−1+1−1", "1+1−1−1", and "1+1−1+1". The enumeration is accumulating K connections as follows:

0 connection: C(N,0)

1 connection: C(N−1, 1)

2 connections: C(N−2, 2)

...

K connections: C(N−K, K)

...

N/2 Connections

For N=10, the combinations are C(10,0)+C(9,1)+C(8,2)+C(7,3)+C(6,4)+C(5,5)=1+9+28+35+15+1=89. In comparison with traditional spatial ambiguity, the combinations for length=10 are 3^10=59049 which is obviously impractical to enumerate. For a given sequence with temporal ambiguity in length N (where N is unlikely greater than 8 which is calculated against the dictionary of 57,000 words, hence we fix the maximum length of temporal ambiguity sequence to 8 and resolve the rare exceptions by dictionary lookup), we can enumerate all combinations in 2^(8−1) and omit illegal combinations such that exists a symbol with 2 connections.

It is obvious that the temporal ambiguity proposed by the present invention is a better solution comparing to the prior ones when amount of combinations is taken into consideration.

In one embodiment, the temporal ambiguity can be resolved by lookup against a stored dictionary like traditional spatial ambiguity. Temporal ambiguity is less ambiguous than traditional spatial ambiguity. In current implementation against about 39,000 dictionary words, there are less than 50 encoded sequences map to two words and no encoding maps to greater than two words. In other words, 99.87% of these dictionary words can be uniquely identified. Current invention greatly reduces the mental processing overhead of the traditional spatial ambiguity by providing very limited alternatives that in this case has only one alternative. For example, in traditional spatial ambiguity, it is required to exam up to 12 alternative words that match encoding "HOME" while there is only one dictionary word matches current invention's encoding "HOME". Even in the worst case, only one alternative dictionary word is possible. With this observation, users can quickly select alternative word if non-intended word is presented without very careful examines.

If in the very rare case that there are more than two candidate words, users are required to select one from them to resolve ambiguity. One solution is use a special function key, such as '*', to roll over candidates and let users choose one. Another solution is display them simultaneously since the candidates are quite a few. The priority of appearance for choosing can base on word frequency or linguistic score calculation.

Figure 5A:
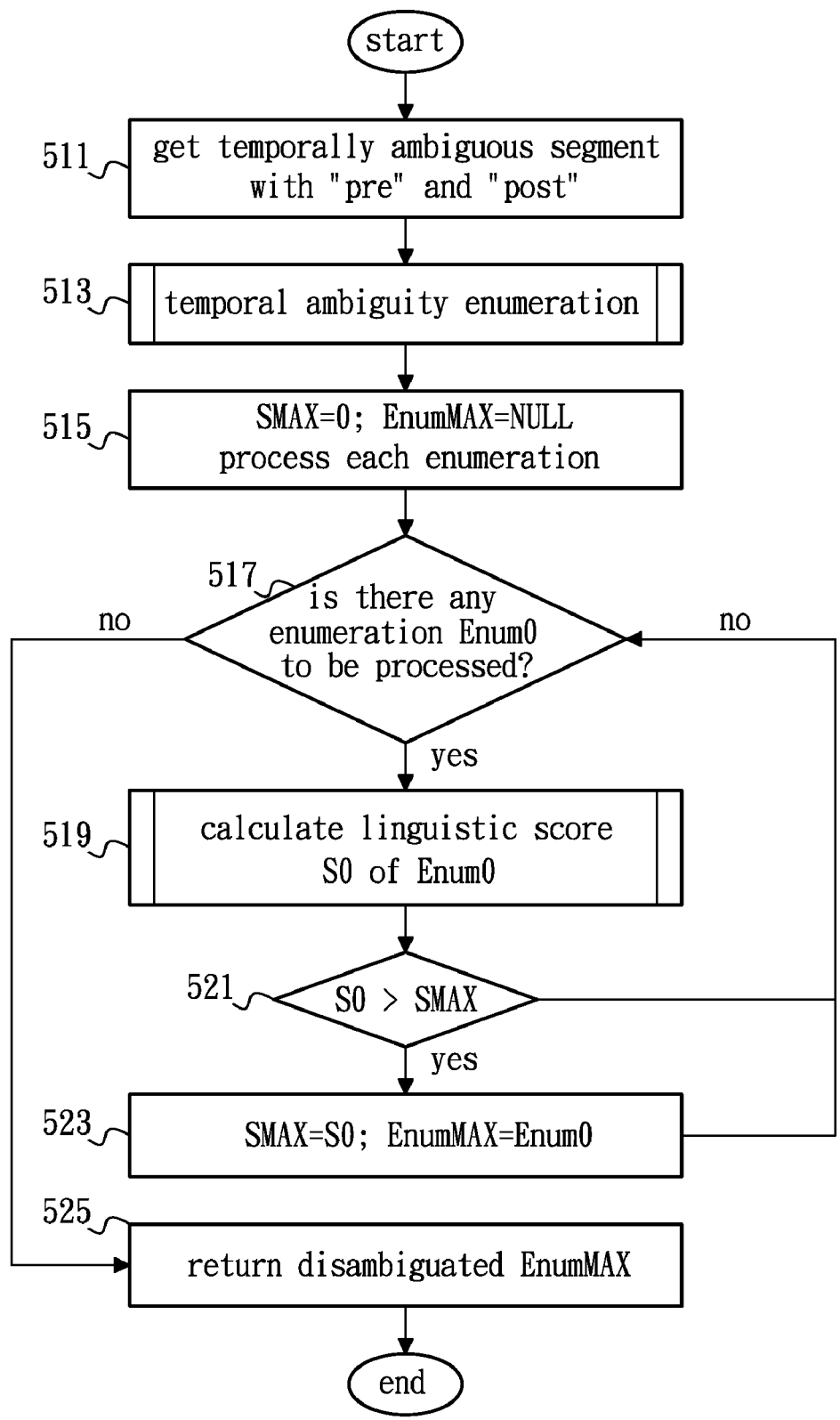
FIG. 5A is a flow chart of Linguistic Temporal Ambiguity Resolution in according to one embodiment of the present invention.
Figure 5B:
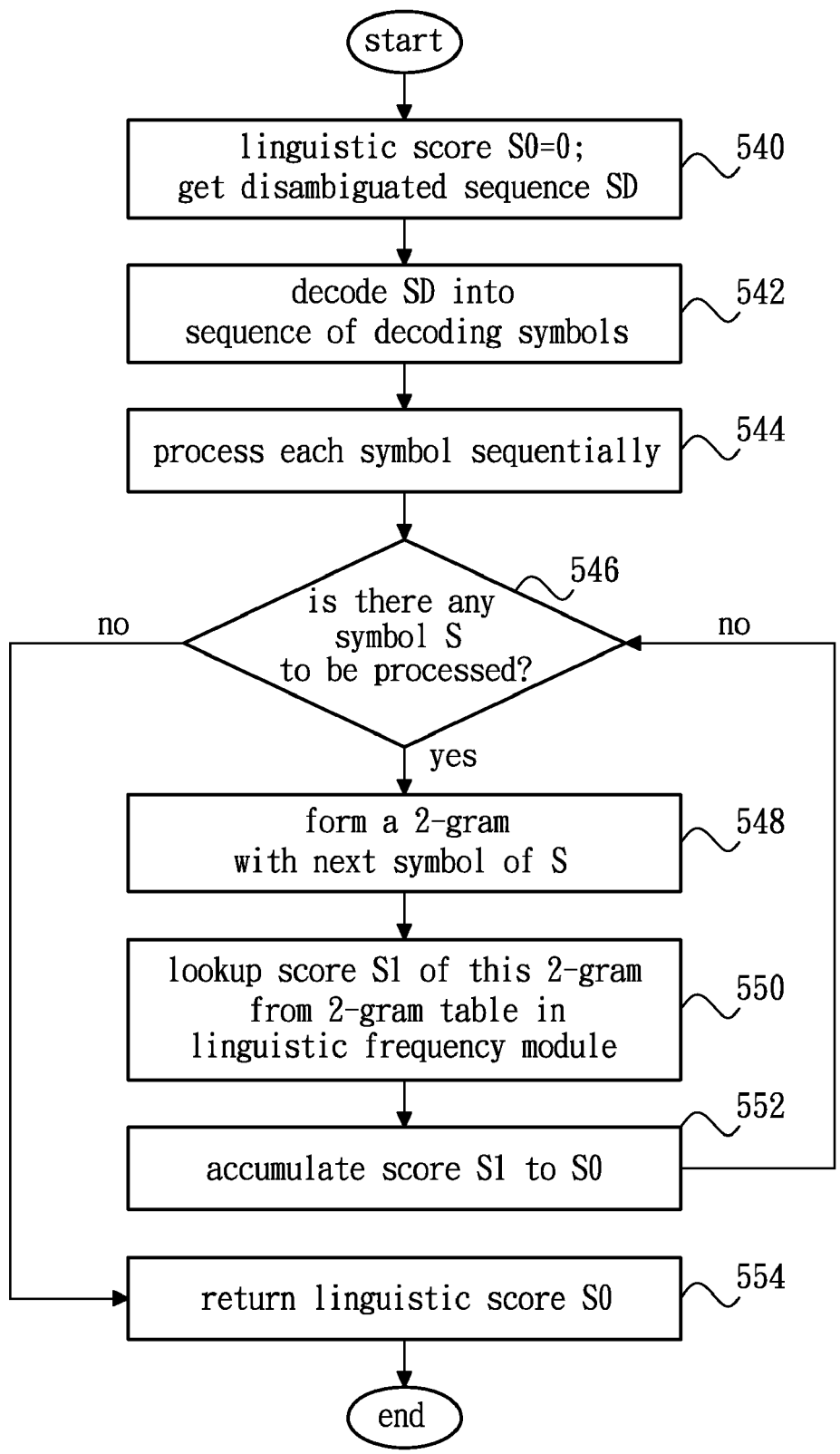
FIG. 5B is a flow chart of Linguistic Score Calculation utilizing linguistic 2-gram statistics in according to one embodiment of the present invention.

It is theoretically possible to apply linguistic resolution on traditional spatial ambiguity but impractical due to its exponential combinations. Instead, linguistic resolution can be applied on temporal ambiguity introduced by this invention to reduce dictionary lookup. This is illustrated in FIGS. 5A and 5B. Refer to FIGS. 5A and 5B, wherein FIG. 5A is a flow chart of linguistic temporal ambiguity resolution in according to one embodiment of the present invention and FIG. 5B is a flow chart of linguistic score calculation utilizing linguistic 2-gram statistics in according to one embodiment of the present invention. The procedures of linguistic temporal ambiguity resolution and linguistic score calculation utilizing linguistic 2-gram statistics will be discussed in detail below.

Refer to FIG. 5A, the procedure of linguistic temporal ambiguity resolution firstly gets a temporally ambiguous segment, sets last symbol of a first segment previous to the temporally ambiguous segment as "pre" and sets first symbol of a segment post to the temporally ambiguous segment as "post" in step 511. All combinations of temporal ambiguity of this temporally ambiguous segment are enumerated and each enumeration is a disambiguated input sequence (step 513). After that, a provisional maximum linguistic score SMAX and its disambiguated sequence EnumMAX are initialized in step 515, and each enumeration is started to be processed in step 517. For each enumeration, linguistic score calculation is performed on current enumeration Enum0 to obtain a result S0 (step 519), and values SMAX and EnumMAX are updated when S0>SMAX (step 521 and 523). After processing all enumerations, the provisional maximum linguistic score SMAX is now real maximum linguistic score and EnumMAX is returned (step 525).

Refer to FIG. 5B, the procedure of linguistic score calculation utilizing linguistic 2-gram statistics utilizes a linguistic frequency module, which has 2-gram linguistic statistics, for calculating a score of a received disambiguated input sequence SD. Step 540 does the initialization of the procedure, and, after initialization, the input sequence SD is decoded into decoding symbol sequence composed of decoding symbols in step 542. The decoding symbols are processed sequentially (steps 544 and 546). For each decoding symbol, a current processed symbol S is combined with next symbol to form a 2-gram (step 548). The score S1 of the 2-gram is lookup and accumulated in the linguistic score S0 (steps 550 and 552), wherein the accumulation can be addition, multiplication or other criteria. For example, the decoding symbol sequence "HOME" is calculated by accumulating statistics of 2-grams "HO", "OM" and "ME". After all the decoding symbols of this decoding symbol sequence are processed, the accumulated linguistic score S0 is returned (step 554).

Accordingly, the linguistic temporal ambiguity resolution mentioned above returns a disambiguated input sequence EnumMAX composed of encoding symbols, and can be decoded into sequence of decoding symbols unambiguously. One may check the predication for a given word by firstly encoding this word into sequence of encoding symbols and then do linguistic temporal ambiguity resolution. If the prediction of a word encoding is equivalent to this word, it is called a hit and no dictionary lookup is needed. Hit ratio is defined as hit words over total words for a set of words. In addition to avoid dictionary lookup, the words that can be linguistically resolved also can be omitted from the stored dictionary. This can greatly reduce the size of the stored dictionary. In one embodiment, only about 3100 words are needed in the stored dictionary with 81.3% hit ratio of 36,000 of least frequency words and 100% hit ratio of the rest in a English dictionary of 57,000 words.

It is possible to further improve the hit ratio by knowledge of target language. Linguistic score can be compensated according to the knowledge to provide a better guess. For example, 3 successive consonants (excluding ending 'S' used with plural nouns) are very rare. A linguistic score penalty is added to such conditions to avoid some false candidate words. The penalty can be carefully tuned for better hit ratio. If there are words do with 3 successive consonants and false rejected by this adjustment, they can be found from the stored dictionary.

Optimistic temporal ambiguity resolution is a linguistic temporal ambiguity resolution that utilizes some heuristics without evaluating all combinations. The present invention applies a greedy approach to provide an optimistic resolution, i.e. should any ambiguity occur we prefer maximum matching sequences. For example, "10" can be "1:0" as "10" or be "10" as "D" in coding of FIG. 4, and "D" is chosen according to this greedy approach.

When the optimistic temporal ambiguity resolution is applied, a disambiguated input sequence should be generated by optimistic resolution first. The linguistic score of this disambiguated input sequence is evaluated by way of those showing in FIG. 5B. When the accumulated score is satisfied of certain criteria, such as the accumulated score is greater than a minimum acceptable level, the decoded result is output to the user. Once the accumulated score is less or equal to the minimum acceptable level, the linguistic temporal ambiguity resolution described above is activated to do a better guess.

A plurality of mappings that maps one encoding symbol set to one decoding symbol set can be used in the above mentioned coding scheme. One of the mappings is a shape-based mapping. Although there are a plurality of shape-based mappings are disclosed by the prior arts, such as U.S. Pat. No. 4,008,793, U.S. Pat. No. 4,877,405, U.S. Pat. No. 5,307,267, U.S. Pat. No. 6,837,633, U.S. Pat. No. 6,874,960, U.S. Pat. No. 7,098,919, U.S. Pat. No. 4,173,753, U.S. Pat. No. 5,305,207, U.S. Pat. No. 5,790,055, U.S. Pat. No. 6,362,752, U.S. Pat. No. 6,686,907, U.S. Pat. No. 6,766,179, U.S. Pat. No. 5,982,303 and U.S. Pat. No. 6,753,794, the present invention provides a new shape-based mapping different to those prior arts. It is a great amount of researches on symbol encoding but none of them utilize shape-changing operations in their coding scheme. However, according to one embodiment of the present invention, one encoding sequence may include at least two encoding symbols, and a predetermined shape changing type of a formal symbol in the encoding sequence is denoted by a latter symbol neighboring to the formal symbol.

Some operations of the shape-based mapping provided in the present invention may be categorized into non-operation, transformative operation, constructive operation, destructive operation and deformative operation. The non-operation is used when the shape of the encoding symbol is substantially identically to the decoding symbol. The transformative operation includes shape rotate, shape mirror, shape deflate, etc. The constructive operation includes stroke-based or combination of shapes. The destructive operation includes stroke removal, cutting (i.e., dividing without obeying stroke construction) and notching (i.e., break closed area). The deformative operation is used when shapes of one encoding symbol and mapped decoding symbol can be correlated with intermediate shapes.

FIG. 6 is a preferred embodiment of this invention. The first row is the keyboard alphabet (i.e., an example of encoding symbol set) 600. The second row is the normal appearance of English letter alphabet (i.e., an example of decoding symbol set) 601. The third row is intermediate shapes 603 between English letters (i.e., decoding symbols) and numerals (i.e., encoding symbols). The fourth row is the mapping 603 with numeral or combination of numerals. The destructive operation is represented by '4' which is like a pointing stab in third row. The destructive operation 604 of the 'C' column is a "Cut" operation while the rest are "Notch" operations. According to the shape-based mapping provided by this invention, one can easily translate decoding symbols (2nd row) to the intermediate forms (3rd row) and finally to the coding numeral or numerals (4th row). It is also intuitive vice versa.

Figure 4:
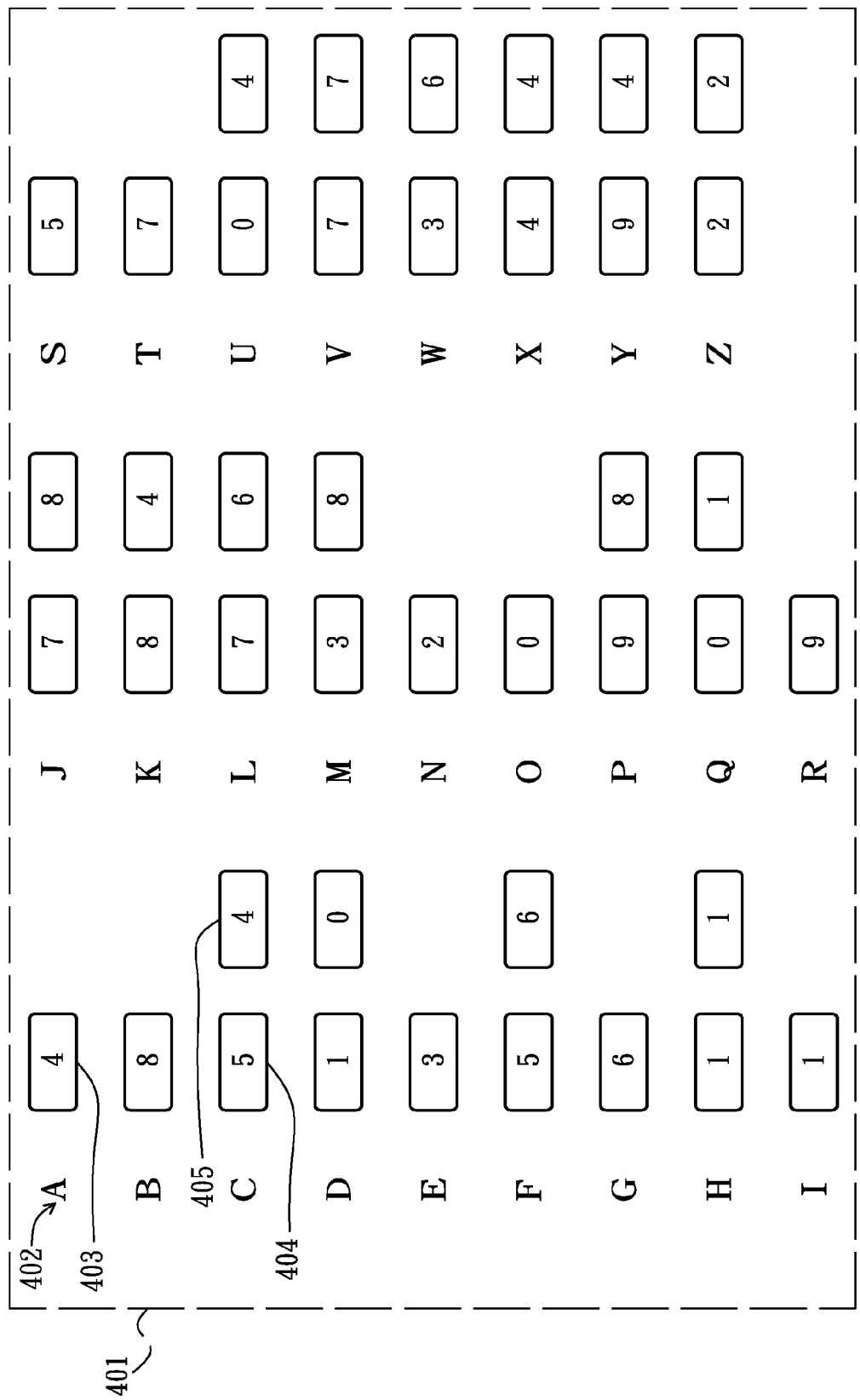
FIG. 4 is the coding scheme mapping sequences of decoding symbols to sequences of encoding symbols according to one embodiment of the present invention.

The coding scheme shown in FIG. 4 can be derived from the shape-based mapping provided in FIG. 6 and will be discussed in more detail below. The coding scheme or mapping 401 contains a plurality of decoding symbols 402 that may be mapped to 1-symbol token with key 403 or 2-symbol token with keys 404 and 405. Note that although 'G' can be coded as "67" by combination of shapes, it also can be coded as "6" with deformative operation and "6" is the result code in FIG. 4. Generally, rule with the more significant code, which contains more shape information, has higher precedence. This makes human easier to identify the first code by most significant shape and second code by least significant shape. For example, 'Q' is a combination of '0' and '1' since '0' contains more shape information. Accordingly, the result coding of 'Q' is "01".

According to the invention, users no longer hunt-and-peck letters from the specific labels on a keyboard. Instead, one can use numerals on the keyboard to quickly enter mental mnemonics for input. The manufacturers of cellphone or keyboard can seamlessly adapt this invention since no special labels are needed.

While input, users can intuitively check whether the intended button was indeed selected. Take decoding 'Q' for example, if the display present other than a 'Q' correlated shapes such as '0' after entering first code, users are aware of that previous key press was wrong and a correction is needed. After correctly entering '0' and '1', a 'Q' decoding can be expected but a sequence of "OI" is also possible according to this coding scheme. In either case, the appearances are all correlated with input "01" instead of jumps around like the traditional predictive text input. So the result makes this invention reliable and predictable in the sense of perception.

For each decoding symbol, all possible encoding sequences of encoding symbol that is accepted by design decisions are generated. Every option has an associated weight that is based on design decisions. Generally we give more weight to preferred options. A shape-based token enumeration is a token enumeration with shape-based design decisions, and a multi-level token enumeration is a hierarchy of different design decisions. In one embodiment of a multi-level token enumeration, all possible encoding sequences of encoding symbol for each decoding symbol are generated. The possible encoding sequences may be divided into several logical interpretations such as shape association, cultural association or any other association acceptable.

After token enumeration, such as multi-level token enumeration mentioned above, the result is evaluated to determine the acceptable assignments.

In one embodiment, a linguistic unigram table and a 2-gram table are generated from a corpus of target language, and letters with higher frequency are assigned to one-encoding-symbol based on the linguistic unigram table. If a preferred shape assignment is in a relatively low frequency, it is re-assigned to a double-tap and the one-encoding-symbol is assigned to another decoding symbol with higher frequency. For example, while initial assignments of 'Z' and 'N' are ('Z', "2") and ('N', "2"), they can be re-assigned as ('Z', "22") and ('N', "2") to take advantage of that letter 'N' has higher frequency. The 2-gram table may be utilized to prevent from assignments that introduce more ambiguity than others. For example, "12" is an option to encode "D" in TABLE 1 shown below. After consulting bit95 2-gram table, which is disclosed by William Soukoreff and Scott MacKenzie, Linguistic Diagram Frequency Tables (http://dynamicnetservices.com/~will/academic/bit95.tables.html), it can be found that 2-gram "IN" has relative high frequency and should be avoid if possible. If "12" is chosen according to certain design decision, linguistic score compensation can be utilized to reduce the ambiguity introduced by this assignment.

As shown in TABLE 1, possible mappings between encoding symbols and decoding symbols are categorized into a plurality of relationships including a substantially identical relationship, a transform relationship, a deformative relationship, a composition relationship and a destructive relationship. Furthermore, in the TABLEs shown in the specification below, the symbol "^" stands for a destructive operation, the symbol "@" stands for a transformation operation of rotating, the symbol "%" stands for a transformation operation of mirroring, the symbol "/" stands for "OR", and the one who surrounded by symbol "-" stands for a depreciated assignment.

TABLE 1

| Symbol | Substantially Identical | Transform | Deformative | Composition | Destructive |
|---|---|---|---|---|---|
| A | | | 4 | | |
| B | | | 8 | 13 | |
| C | | | | | 5^/3^/6^ |
| D | | | 0 | 12/1C | |
| E | | 3@/3% | | | 6^/8^^ |
| F | | 5@ | 5 | 7%1@ | 3^ |
| G | | | 6 | 67 | 6^ |

TABLE 1-continued

| Symbol | Substantially Identical | Transform | Deformative | Composition | Destructive |
|---|---|---|---|---|---|
| H | | | | 14/11 | 8^^ |
| I | 1 | | 1 | | |
| J | | 7% | 7 | | |
| K | | | | 17% | 8^^ |
| L | | 7@ | | | |
| M | | 3@ | | 7@7@ | |
| N | | 2@ | 2 | 17@ | |
| O | 0 | | | | |
| P | | 9% | | | |
| Q | | | 9 | 01 | |
| R | | | | 91/12 | 8^ |
| S | | | 5 | | |
| T | | | | 77%1@1 | |
| U | | | | | 0^/(2^@/3^@/5^@) |
| V | | 7@ | | | |
| W | | 3@ | | 77 | |
| X | | | | | 4^/8^^ |
| Y | | | | | 9^ |
| Z | 2 | | 2 | | |

It is important that assignment of the codlings can be applied by two kinds of mappings mentioned above, wherein one of the mappings assigns an encoding sequence to a decoding symbol in consideration of frequency of each decoding symbol, and another one of the mappings assigns an encoding sequence to a decoding symbol in consideration of possible mappings provided in token enumeration. The two mappings can be applied to make decisions of assignment of the codlings in any order. For example, result of code assignments and confliction resolving based on unigram statistics, which is provided by First-Order Statistics (Statistical Distributions of English Text, http://www.data-compression.com/english.html), is provided in TABLE 2. It can be seen that some of the decoding symbols with higher frequency are assigned to unigram (or single-symbol) encoding sequences. These decoding symbols are such as "A", "E", "I", "O", "R", "S", and "T". Some decoding symbols, such as "B" and "G", are assigned to unigram encoding sequences due to their highly likeness to the encoding symbols "8" and "6", respectively. The decoding symbol "Z" is firstly assigned to a unigram encoding symbol "2". However, since the unigram encoding symbol "2" is a possible mapping of decoding symbol "N" and the decoding symbol "N" has much higher frequency than the decoding symbol "Z" in according with linguistics, the unigram encoding symbol "2" is re-assigned to the decoding symbol "N" and the decoding symbol "Z" is assigned to a double-tap encoding symbol "22".

TABLE 2

| Symbol | Substantially Identical | Transform | Deformative | Composition | Destructive |
|---|---|---|---|---|---|
| A | | | 4 | | |
| B | | | 8 | | |
| C | | | | | 5^/3^/6^ |
| D | | | -0- | 12/1C/10 | |
| E | 3 | | | | |
| F | | 5@ | -5- | 7%1@ | 3^ |
| G | | | 6 | | |
| H | | | | 14/11 | 8^^ |
| I | 1 | | | | |
| J | | 7% | -7- | | |
| K | | | | 17% | 8^^ |
| L | | 7@ | | | |
| M | | 3@ | | 7@7@ | |
| N | | | 2 | | |

TABLE 2-continued

| Symbol | Substantially Identical | Transform | Deformative | Composition | Destructive |
|---|---|---|---|---|---|
| O | 0 | | | | |
| P | | 9% | | | |
| Q | | | -9- | 01 | |
| R | | | 9 | | |
| S | | | 5 | | |
| T | | | 7 | | |
| U | | | | | 0^/(2^@/3^@/5^@) |
| V | | 7@ | | | |
| W | | 3@ | | | |
| X | | | | 77 | |
| Y | | | | | 4^/8^^ |
| Z | | | | | 9^ |
| | | | | 22 | |

Another kind of the possible mappings are taken into consideration. In one embodiment, the assignments are considered in the order of substantially identical relationship, transform relationship, deformative relationship, and composition or destructive relationship. The results of the assignments are shown in TABLE 3.

TABLE 3

| Symbol | Substantially Identical | Transform | Deformative | Composition | Destructive |
|---|---|---|---|---|---|
| A | | | 4 | | |
| B | | | 8 | | |
| C | | | | | 5^/3^/6^ |
| D | | | -0- | 12/1C/10 | |
| E | | 3 | | | |
| F | | 5@ | | | |
| G | | | 6 | | |
| H | | | | 14/11 | 8^^ |
| I | 1 | | | | |
| J | | 7% | | | |
| K | | | | 17% | 8^^ |
| L | | 7@ | | | |
| M | | 3@ | | | |
| N | | | 2 | | |
| O | 0 | | | | |
| P | | 9% | | | |
| Q | | | | 01 | |
| R | | | 9 | | |
| S | | | 5 | | |
| T | | | 7 | | |
| U | | | | | 0^ |
| V | | 7@ | | | |
| W | | 3@ | | | |
| X | | | | | 4^/8^^ |
| Y | | | | | 9^ |
| Z | | | | 22 | |

Combinations of encoding sequences from TABLE 3 provides 72 choices because of possible mappings of decoding symbols "C", "D", "H", "K", and "X". Operators used for denoting operation performed on the formal encoding symbol of the operators can be chosen in any consideration. For example, operator stands for mirror operation can be chosen from numeric 8 or 0, operator stands for rotating operation can be chosen from numeric 6 or 9, and operator stands for destructive operation can be chosen from any other numeric. In one embodiment, numeric "8" stands for mirror operation because the numeric "8" looks like two mirrored "o"; numeric "6" stands for rotating operation because the numeric "6" looks like a whirl; numeric "4" stands for destructive operation because the numeric "4" looks like a stab. Accordingly, one of the final mappings can be shown in TABLE 4 below.

TABLE 4

| Symbol | Substantially Identical | Transform | Deformative | Composition | Destructive |
|---|---|---|---|---|---|
| A | | | 4 | | |
| B | | | 8 | | |
| C | | | | | 5^ |
| D | | | | 10 | |
| E | | 3 | | | |
| F | | 5@ | | | |
| G | | | 6 | | |
| H | | | | 11 | |
| I | 1 | | | | |
| J | | 7% | | | |
| K | | | | | 8^ |
| L | | 7@ | | | |
| M | | 3@ | | | |
| N | | | 2 | | |
| O | 0 | | | | |
| P | | 9% | | | |
| Q | | | | 01 | |
| R | | | 9 | | |
| S | | | 5 | | |
| T | | | 7 | | |
| U | | | | | 0^ |
| V | | 7@ | | | |
| W | | 3@ | | | |
| X | | | | | 4^ |
| Y | | | | | 9^ |
| Z | | | | 22 | |

It is important that mapping between encoding symbols and decoding symbols may contain assignments other than those shown in TABLE 4. However, the assignment can be determined by enumerating all acceptable combinations of possible mappings, determining operators and at least one criterion selected from the group consisting of shape-based mapping score, size of a stored dictionary to disambiguate input, ambiguity length distribution of decoding sequences, hit ratio of optimistic temporal ambiguity resolution, hit ratio of linguistic temporal ambiguity resolution, hit ratio of cascade of optimistic and linguistic temporal ambiguity resolution, hit ratio distribution according to frequency of decoding sequence, keys per character calculated from unigram statistics, optimization across a set of natural languages; and temporal ambiguity measures. For all enumerated acceptable combinations, a weighted score of pre-determined criteria described above is calculated, or alternatively, a preferred assignment is manually selected and accepted if it satisfies the pre-determined criteria.

The shape-based mapping and temporally ambiguous coding scheme can work independently or, in another way, work together to form a text input system.

Figure 7:
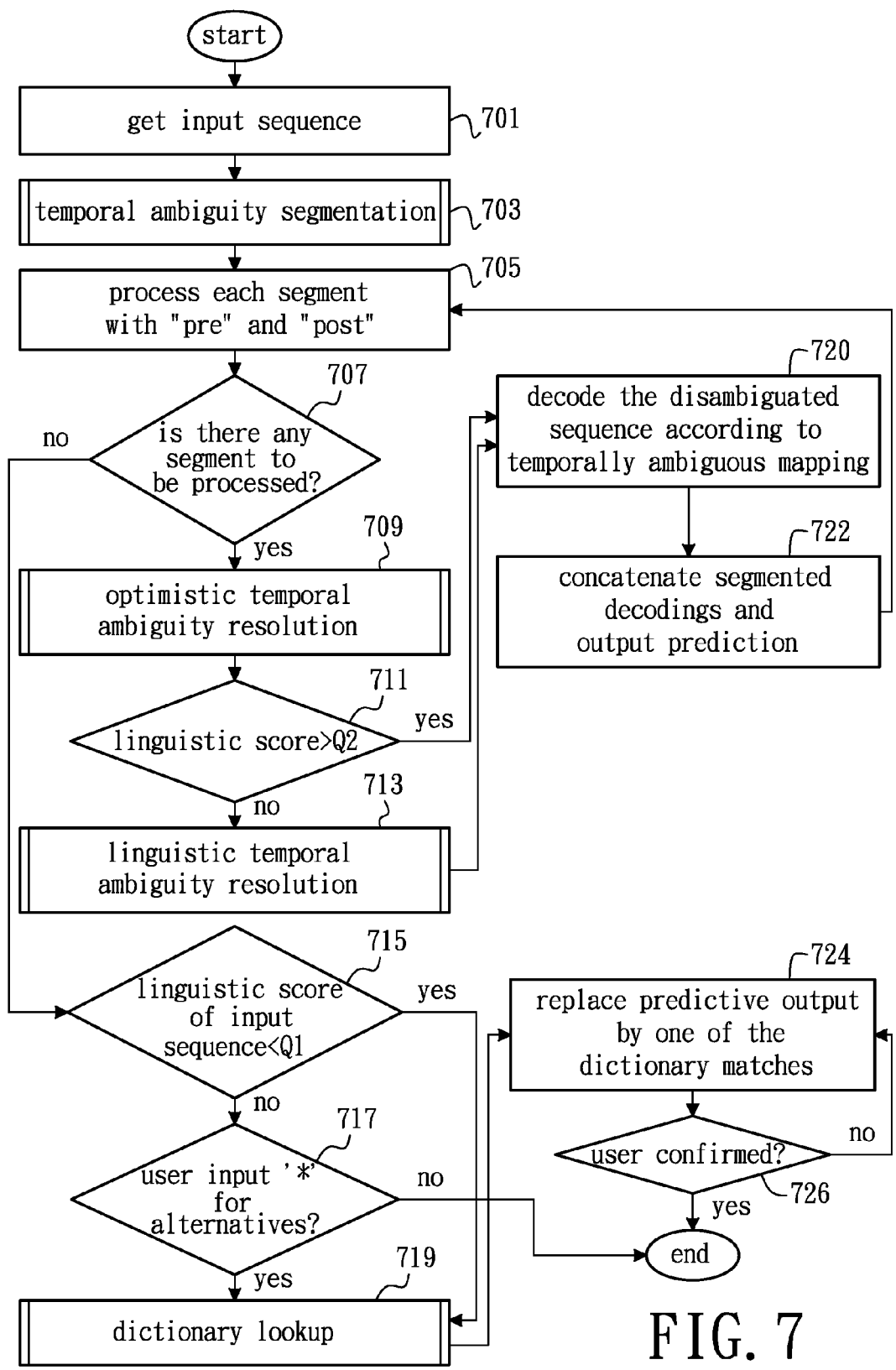
FIG. 7 is a flowchart of temporal ambiguity resolution in according to one embodiment of the present invention.
Figure 8:
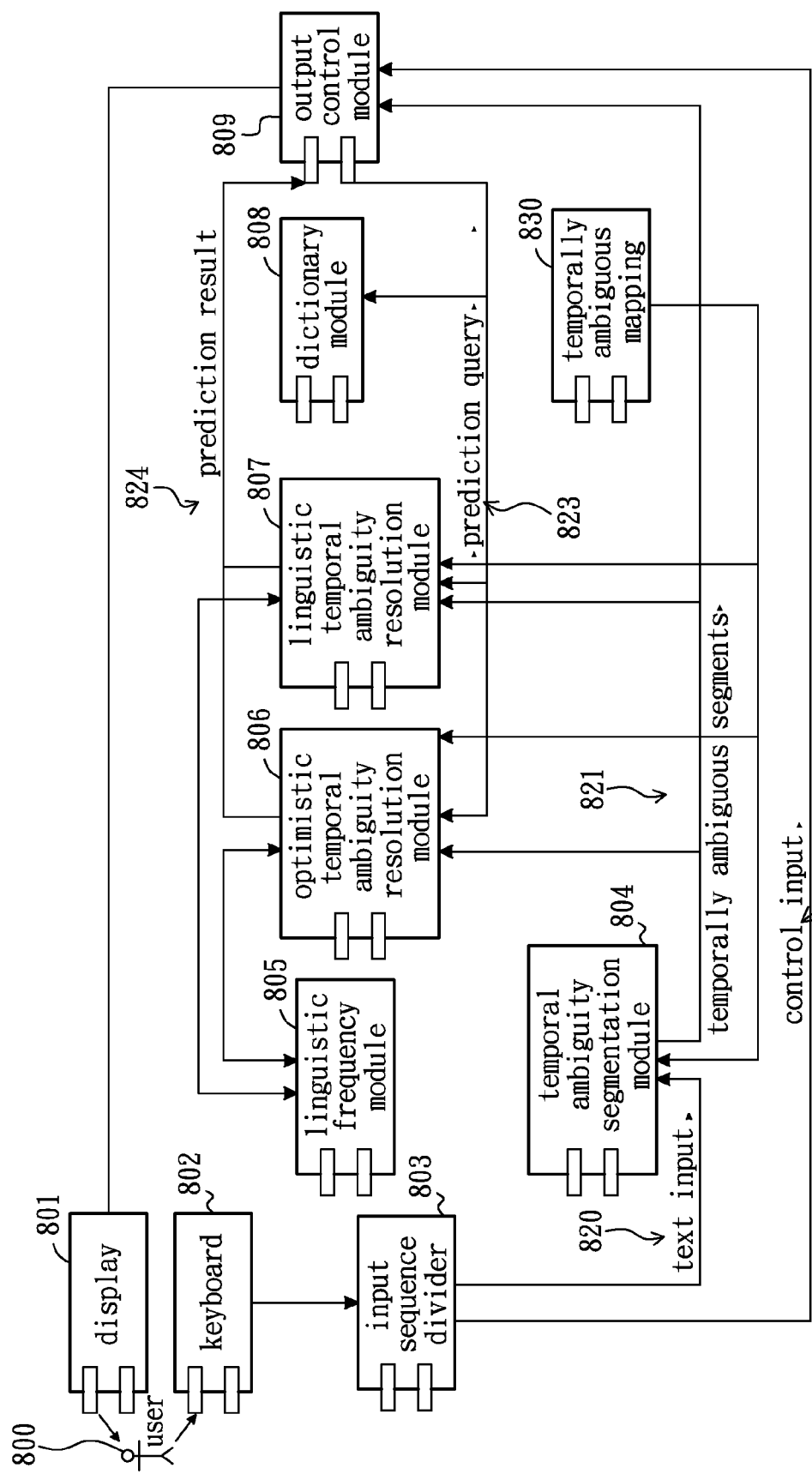
FIG. 8 is a structure diagram of a text input system in according to one embodiment of the present invention.

FIG. 7 is the flowchart of temporal ambiguity resolution in one embodiment of this invention. FIG. 8 is a structure diagram of a text input system in according to one embodiment of the present invention. Refer to FIG. 7 and FIG. 8, the user 800 inputs an input sequence by activating the keyboard 802. The input sequence divider 803 separates the input sequence into text input 820 and control input 822. The control input 822 is sent to the output control module 809 while the text input 820 is sent to the temporal ambiguity segmentation module 804. The temporal ambiguity resolution starts from step 701 when the text input 820 is sent to the temporal ambiguity segmentation module 804. The text input 820 is processed by temporal ambiguity segmentation module 804 to generate temporally segmented sequence 821 (step 703). At step 705, each segment of the temporally segmented sequence 821 is then processed with "pre" symbol, which is the last symbol from previous segment and "post" symbol, which is the first symbol from post segment. If there is still segment to be processed at step 707, current segment is processed by optimistic temporal ambiguity resolution module 806 (step 709) by utilizing statistics stored in the linguistic frequency module 805.

If the linguistic score calculated in step 711 against the result from step 709 is greater than a pre-determined value Q2, the disambiguated input sequence is accepted and is decoded in step 720. Otherwise, linguistic temporal ambiguity resolution module 807 is activated to elect the best disambiguated input sequence (step 713). All the disambiguated input sequences generated from the temporally ambiguous segments are concatenated in step 722 to generate prediction result 824 and output to the display 801 via the output control module 809. If all the segments are processed and the execution is branched from step 707 to step 715, linguistic score of the input sequence is calculated in step 715. If the result of step 715 is smaller than another predetermined value Q1, the prediction is assumed to be not acceptable and dictionary lookup is performed for better prediction (step 719) by outputting a prediction query 823 to the dictionary module 808 from the output control module 809. Otherwise, request for alternatives from user in step 717 is checked. If no such request, the prediction is implicitly accepted by user, else dictionary lookup is activated (step 719). After dictionary lookup, one of the matches is determined to replace the original prediction in step 724 and user can utilize a special function key such as '*' to select and confirm intended word in step 726.

In another embodiment, the output control module 809 may directly coupled to the input sequence divider 803 or even the keyboard 802 for receiving the text input 820 and control input 822 directly. The received text input 820 and control input 822 may be sent to the dictionary module 808 for looking up a matching encoding sequence and corresponding decoding sequence for outputting.

It is noted that, the components of this invention can be arranged in client-server model such that the coupling is over a communication channel and messages are transmitted in a pre-determined protocol. The temporal ambiguity segmentation module may be duplicated both on client and server sides depends on whether a module requires this data as input exists. The output of the temporal ambiguity segmentation module may direct to consumer modules in parallel as depicted in the preferred embodiment or alternatively in a waterfall manner. The said keyboard of this invention has a plurality of keys responsive to user activation, wherein keys are responsive to the user activation mediated by one of the physical senses of sight, hearing, touch, taste, and smell. The keyboard of this invention can also be any output of sequences of keyboard symbols. Moreover, the display can be selected from the group consisting of visual, auditory, tactile, gustatory and olfactory displays.

Although all temporal ambiguity resolutions are used in the preferred embodiment demonstrated in FIG. 7, the combinations of these resolutions are still applicable. In an extreme case, the dictionary lookup can be totally omitted by redirecting the "NO" branch of 707 to end state.

Figure 9A:
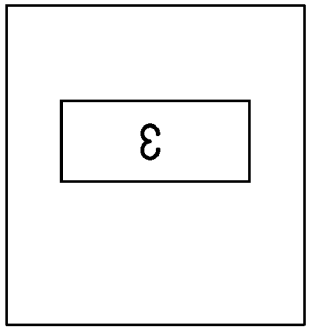
FIGS. 9A-9I show input and disambiguating of "WORK" with dictionary lookup in according to one embodiment of the present invention.
Figure 9B:
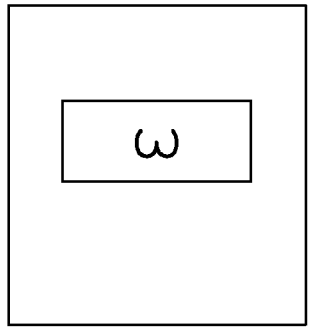

Refer to FIGS. 9A-9G, which show input and disambiguating of "WORK" with dictionary lookup in according to one embodiment of the present invention. The coding scheme (mappings between encoding sequences and decoding sequences) used in the embodiment is the one shown in FIG. 6. In FIG. 9A, the user inputs the first encoding symbol "3" of an input sequence, and the output device shows an intermediate form of "E", which can be found in FIG. 6. After that, the user inputs a second encoding symbol "6" of the input sequence in FIG. 9B and the output device shows the intermediate form of "W" on the position where the intermediate form of "E" was shown. The input sequence "36" may be mapped to two decoding symbols "EG" other than "W" according to the encoding scheme shown in FIG. 4. However, optimistic temporal ambiguity resolution is applied in the embodiment such that a maximum matching encoding sequence is preferred when any ambiguity occurs. Accordingly, the decoding symbol "W" which has a two-length encoding sequence "36" is preferred than decoding symbols "EG", each of which has one-length encoding sequence.

Figure 9C:
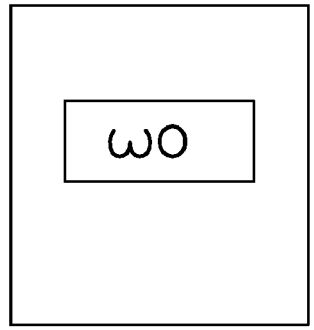
Figure 9D:
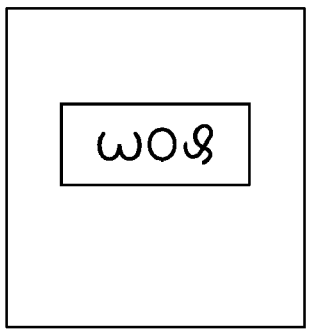

In FIG. 9C, when the user continues to input a third encoding symbol "0" of the input sequence, the encoding symbol "0" is deemed as another segment of the input sequence because there is no encoding sequence matches an input sequence "60". Accordingly, the output device further shows an intermediate form of "0". After that, the user further inputs a fourth encoding symbol "9" and the encoding symbol is temporally segmented as a new segment because there is no encoding sequence matches an input sequence "09". Accordingly, the output device further shows an intermediate form of the decoding symbol "R" in FIG. 9D because the decoding symbol R is mapped by the encoding sequence composed of the encoding symbol "9".

Figure 9E:
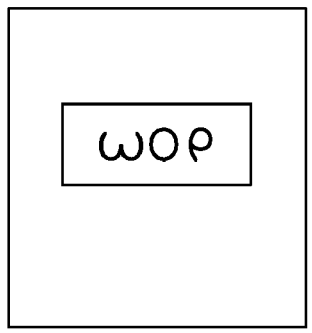
Figure 9F:
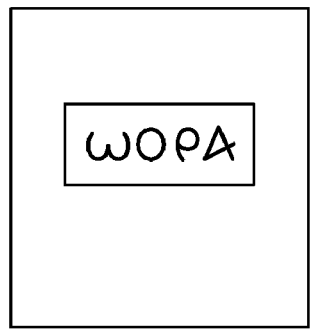
Figure 9G:
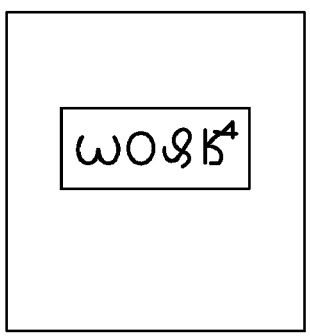

When the user further input a fifth encoding symbol "8", the originally shown intermediate form of "R" is changed to the intermediate form of "P" as shown in FIG. 9E because a two-length encoding sequence "98" which maps to the decoding symbol "P" is preferred according to the optimistic temporal ambiguity resolution. After that, the user further inputs a sixth encoding symbol "4" and the output device further shows an intermediate form of decoding symbol "A" in FIG. 9F because the encoding sequence "984" is segmented into "98:4" since the decoding symbol "R" is determined prior to the inputting of encoding symbol "4". It is therefore a false prediction "WOPA" occurs. At this time, the user may correct the false prediction by inputting an encoding symbol "*" to invoke dictionary lookup. The dictionary lookup makes the output device show the intermediate form of decoding sequence "WORK" which is a match of encoding sequence "360984" from a stored dictionary.

Consecutively entering of '*' will sequentially enumerate all matches. In this case, only one candidate word is valid so it may be immediately confirmed as intended word.

Figure 9H:
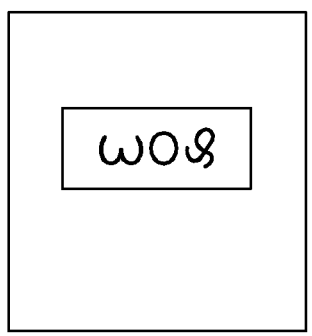
Figure 9I:
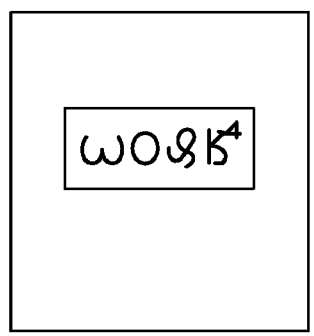

However, the false prediction can be corrected in other ways. For example, delimiting control is shown in FIGS. 9E, 9H and 9I. As stated above, the output device shows intermediate form of decoding sequence "WOP" after the user inputs an input sequence composed of the encoding symbols "36098" when utilizing optimistic temporally ambiguity resolution.

Once the user finds out that a false prediction occurs at this time, a special function key, such as "#", can be used for delimiting control. In the embodiment, the user may input encoding sequence "##" to activate as delimiting control encoding sequence. Accordingly, when the user inputs encoding symbols "##" after the input sequence "36098", the delimiting control encoding sequence "##" is separated into control input as shown in FIG. 8 and is transmitted to the output control module 809 shown in FIG. 8. Therefore, as shown in FIG. 8, the output control module 809 sends a request to the optimistic temporal ambiguity resolution module 806 and/or the linguistic temporal ambiguity resolution module 807 to change the encoding segment "98" into a new interpretation of "9:8". As shown in FIG. 9H, the output device therefore shows an intermediate form of decoding symbol "R" on the place shown the intermediate form of decoding symbol "P". The encoding symbol "4" input after the encoding symbols "##" is therefore combined with the encoding symbol "8" to form a text input "84" and finally to be decoded as the decoding symbol "K". It is therefore an intermediate form of decoding symbol "K" shown on the output device in FIG. 9I.

For traditional predictive text input, the confirmation is required to choose possible candidates or the information is too ambiguous to read. Additionally, any typo during input cannot be recovered and may make a short message completely unreadable. In summary, it is not applicable in the situation of feedbackless typing. The present invention can be applied for feedbackless typing because the present invention utilizes mental mnemonics instead of table lookup, and no timeout or timeout kill is needed to distinguish from previous input token. Furthermore, the candidate words are correlated with visual appearance hence delayed feedback typing can be applied to accept unintended predictions when input and later be resolved manually by user. In an extreme condition, all inputs are logged without any prediction and later resolved by this invention.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A decoding method for mapping a plurality of encoding sequences to a plurality of decoding sequences, each of the encoding sequences including at least one encoding symbol chosen from an encoding symbol set, each of decoding sequences including at least one decoding symbol chosen from a decoding symbol set which is used by non-logographic languages, the decoding method comprising the steps of:
   receiving an entered encoding symbol; and
   combining the entered encoding symbol to an end of an input sequence,
   wherein the input sequence is temporally ambiguous such that the input sequence has possibility to be interpreted as at least two different encoding sequence combinations, each of which includes at least one of the encoding sequences.

2. The decoding method of claim 1, wherein interpreting the input sequence is determined by matching a dictionary, wherein the dictionary includes acceptable correlationship between the encoding sequences and the decoding sequences.

3. The decoding method of claim 1, wherein interpreting the input sequence is determined by a linguistic model.

4. The decoding method of claim 3, wherein the linguistic model utilizes linguistic score calculation that applied on the encoding sequence combinations.

5. The decoding method of claim 1, wherein interpreting the input sequence is determined by a heuristic based on a linguistic model such that linguistic score calculation is capable of being applied on only a portion of the encoding sequence combinations.

6. The decoding method of claim 5, wherein the heuristic is greedy such that the said portion of the encoding sequence combinations characterized in the longest match possible is applied on the mapping of encoding sequence.

7. The decoding method of claim 1, further comprises the step of determining according to the mapping such that symbols in the input sequence before the entered encoding symbol to be a segmented sequence including at least one segment when the last two symbols of the input sequence do not form a part of any encoding sequence in the mapping.

8. An apparatus, comprising:
   a keyboard, for inputting an input sequence including at least one encoding symbol chosen from an encoding symbol set;
   an output device, for selectively outputting an output sequence including at least one decoding symbol chosen from a decoding symbol set, wherein the output sequence is generated in accordance with the input sequence;
   a decoding device, including a mapping which maps a plurality of encoding sequences, each of which includes at least one encoding symbol chosen from the encoding symbol set, to a plurality of decoding sequences, each of which includes at least one decoding symbol, the mapping is used to map the input sequence to the output sequence in according to at least a part of the encoding sequences,
   wherein, when one encoding symbol is entered by the keyboard, the decoding device combines the entered encoding symbol to end of an input sequence and the input sequence is temporally ambiguous such that the input sequence has possibility to be interpreted as at least two different encoding sequence combinations.

9. The apparatus of claim 8, wherein the decoding device further comprises an input sequence divider coupling to the keyboard for receiving the input sequence and separating the input sequence into a text input and a control input.

10. The apparatus of claim 9, wherein the mapping comprises:
    a temporal ambiguity segmentation module, coupled to the input sequence divider for receiving the text input and generating a temporally segmented sequence accordingly when the last two symbols of the text input do not form a part of the encoding sequence;
    a linguistic frequency module for storing a plurality of statistics;
    a linguistic temporal ambiguity resolution module, coupled to the temporal ambiguity segmentation module and the linguistic frequency module for calculating score of each of encoding sequence combinations of the segment according to the statistics such that the calculated score is used for determining a prediction result as the decoding sequence.

11. The apparatus of claim 10, wherein the decoding device further comprises an output control module, which is coupled to the linguistic temporal ambiguity resolution module for receiving and outputting the decoding sequence to the output device, and coupled to the temporal ambiguity segmentation module for receiving the temporally segmented sequence.

12. The apparatus of claim 11, wherein the mapping further comprises a dictionary module, which is coupled to the output control module for receiving the temporally segmented sequence and looks for the decoding sequence corresponding to the temporally segmented sequence from a dictionary.

13. The apparatus of claim 10, wherein the mapping further comprises an optimistic temporal ambiguity resolution module, which is coupled to the temporal ambiguity segmentation module and the linguistic frequency module for calculating score of each of encoding sequence combinations of the segment according to the statistics such that score calculation is applied on only a portion of the encoding sequence combinations.

14. The apparatus of claim 9, wherein the mapping comprises:

a temporal ambiguity segmentation module, coupled to the input sequence divider for receiving the text input and generating a temporally segmented sequence accordingly when the last two symbols of the input sequence do not form a part of the encoding sequence;

a linguistic frequency module for storing a plurality of statistics;

an optimistic temporal ambiguity resolution module, coupled to the temporal ambiguity segmentation module and the linguistic frequency module for calculating score of each of encoding sequence combinations of the segment according to the statistics such that score calculation is applied on only a portion of the encoding sequence combinations.

15. The apparatus of claim 9, wherein the mapping comprises an output control module, which is coupled to the input sequence divider for receiving the text input and the control input.

16. The apparatus of claim 15, wherein the mapping further comprises a dictionary module, which is coupled to the output control module for receiving the text input and looks up the decoding sequence corresponding to the text input from a dictionary.

17. A decoding method comprising the steps of:

maintaining a mapping that maps a plurality of encoding sequences, each of which includes at least one encoding symbol chosen from an encoding symbol set, to a plurality of decoding sequences, each of which includes at least one decoding symbol chosen from a decoding symbol set which is used by non-logographic languages;

receiving encoding symbol or symbols into an input sequence;

generating a plurality of encoding sequence combinations if the length of the input sequence is greater than one;

selecting one of the encoding sequence combinations;

mapping the selected encoding sequence combination into an output sequence according to the mapping;

outputting the output sequence.

18. The decoding method of claim 17, wherein a portion of the mapping serving as a dictionary, wherein the dictionary including user acceptable correlationship between encoding sequences and decoding sequences.

19. The decoding method of claim 17, wherein the step of selecting one of the encoding sequence combinations is repeated to select a plurality of the encoding sequence combinations such that the selected encoding sequence combinations are mapped into a plurality of output sequences according to the mapping.

20. The decoding method of claim 19, wherein the output sequences are selectively output and are arranged in order of frequency generated from a given corpus.

21. The decoding method of claim 19, wherein the output sequences are selectively output and are arranged in order of score generated from linguistic score calculation.

22. The decoding method of claim 17, wherein selecting one of the encoding sequence combinations is determined by a linguistic model.

23. The decoding method of claim 22, wherein the linguistic model utilizes linguistic score calculation that applied on the encoding sequence combinations.

24. The decoding method of claim 17, wherein selecting one of the encoding sequence combinations is determined by a heuristic such that linguistic score calculation based on a linguistic model is capable of being applied on only a portion of the encoding sequence combinations.

25. The decoding method of claim 24, wherein the heuristic is greedy such that the portion of the encoding sequence combinations characterized in that the longest match possible is applied on the mapping of encoding sequence.

26. The decoding method of claim 17, wherein a portion of the mapping serving as a coding scheme, wherein the coding scheme maps sequences of encoding symbols to each of the decoding symbols.

27. The decoding method of claim 26, wherein a segmenting step is further performed before the step of selecting one of the encoding sequence combinations such that at least one segmented sequence is generated for the input sequence according to the coding scheme, and one of the encoding sequence combinations is selected according to the generated segmented sequence.

28. The decoding method of claim 27, wherein the segmenting step comprising the steps of:

starting from the start of the input sequence;

forming a token of length two from an current symbol and a next symbol next to the current symbol;

verifying if the token is in the coding scheme;

if the token is in the coding scheme, accumulating the current symbol and continuing on the forming step for the next symbol; and if the token is not in the coding scheme, generating one segmented sequence from the accumulated symbols concatenated with the current symbol and restart the segmenting step from the next symbol.

* * * * *